United States Patent [19]

Mabuchi et al.

[11] 4,022,074

[45] May 10, 1977

[54] COOLING DEVICE

[75] Inventors: Kenichi Mabuchi, Tokyo; Yoshihisa Tsuchimochi, Ichikawa, both of Japan

[73] Assignee: Mabuchi Motor Co. Ltd., Tokyo, Japan

[22] Filed: Feb. 21, 1975

[21] Appl. No.: 551,761

[30] Foreign Application Priority Data

Feb. 27, 1974 Japan .............................. 49-22681

[52] U.S. Cl. ........................... 74/421 A; 310/62; 310/83
[51] Int. Cl.[2] ........................................ F16H 1/12
[58] Field of Search .......... 310/52, 40 MM, 62, 63, 310/40.5, 83, 47, 50, 66, 67, 67 A, 70 A, 58, 59, 53, 89, 91; 320/2; 417/368; 415/122; 416/170; 46/78, 243 AV; 74/421 A, 432

[56] References Cited

UNITED STATES PATENTS

| 2,167,360 | 7/1939 | Hanna | 310/59 |
| 2,970,233 | 1/1961 | Penney | 310/59 |
| 3,274,410 | 9/1966 | Boivie | 310/62 |
| 3,463,950 | 8/1969 | Schadlich | 310/83 |
| 3,525,912 | 8/1970 | Wallin | 320/2 UX |
| 3,715,610 | 2/1973 | Brinkman | 310/58 |
| 3,777,395 | 12/1973 | Chang | 46/78 |
| 3,803,758 | 4/1974 | Chang | 46/78 |

Primary Examiner—R. Skudy

[57] ABSTRACT

A cooling device suitable for a miniature motor is disclosed which uses a combined fan and gear comprising a gear portion integrally formed with a fan portion in order to make the motor shaft as short as possible to minimize the vibration of the shaft.

7 Claims, 2 Drawing Figures

COOLING DEVICE

BACKGROUND OF THE INVENTION

1. Field of the Invention

This invention relates to a cooling device, more particularly, to a cooling device in a miniature motor having a forced-cooling fan, wherein a combined fan and gear, with the fan and gear the portions formed integrally together from synthetic resin, for example, is used in order to make the shaft of the miniature motor as short as possible to minimize the vibration of the shaft rotating at high speed and also to simplify the manufacturing processes of a geared motor with a forced-cooling fan thereby to reduce its cost of manufacture.

2. Description of the Prior Art

In a miniature motor driven at a high speed from a battery, it is highly desirable to make the motor shaft as short as possible to prevent the vibration of the shaft.

Recently, there have been developed quickly chargeable nickel-cadmium type cells provided with relief valves for releasing gas when the cells are overcharged, and such cells are often used to drive electric model airplanes. Since the motor for driving such a model airplane is operated with a current of several amperes, it is desirable that the motor be equipped with a fan for forced cooling thereof to prevent the increase in the resistance of the motor windings.

Generally, in providing a geared motor with a forced-cooling fan, it has been customary to form the gear and the fan separately. This results in a long shaft of the motor, causing undesirable vibration of the shaft in case of the motor rotating at a high speed as when driving a model airplane. It also results in the additional manufacturing process of mounting the fan on the motor shaft and, if the centering in said mounting process is not perfect, it will cause more vibration.

SUMMARY OF THE INVENTION

To solve the problems mentioned above, it is an object of the invention to provide a cooling device comprising an integrally formed gear and fan. It is another object of the invention to provide a cooling device comprising a reduction gear which is integrally formed with a fan. It is a further object of the invention to provide a cooling device comprising a multiplying gear which is integrally formed with a fan.

It is still an object of the invention to avoid undesirable vibration of the shaft of a geared motor by making the length of the shaft short and also to simplify its manufacturing process.

DETAILED DESCRIPTION OF THE EMBODIMENT

Figure 1:
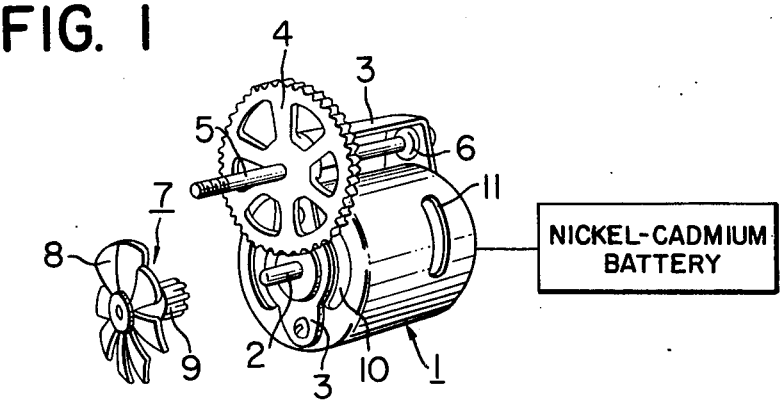
FIG. 1 is an embodiment of a geared motor provided with a reduction gear train formed with a forced-cooling fan.

In FIG. 1, the reference numeral 1 shows the motor case, and 2 the drive or motor shaft. The motor case 1 has fixed thereto a gear frame 3 on which is rotatably supported by bearings 6 a driven shaft 5 with a driven gear 4 secured thereto. Fixed to the drive or motor shaft 2 is a combined fan and gear 7 whose drive gear portion 9 meshes with said driven gear 4. The air flow caused by the fan portion 8 is blown through inlet openings 10 into the motor and discharged from outlet openings 11.

The combined fan and gear 7 in accordance with the invention, comprises a fan portion 8 and a drive gear portion 9 which are integrally formed together from synthetic resin, for instance, the fan portion 8 and drive gear portion 9 being correctly centered. Thus a geared motor with a fan which may be of the type that is energized by a nickel-cadmium battery may be made only by fitting the drive gear portion 9 onto the drive or motor shaft 2 to engage the driven gear 4, it being not necessary to increase the length of the drive or motor shaft 2 to attach the fan portion thereto.

Figure 2:
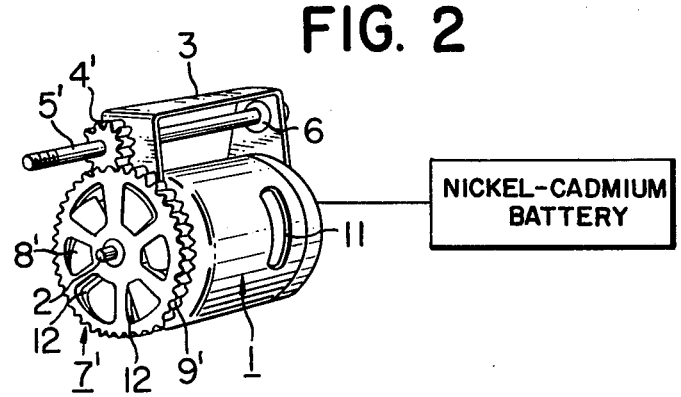
FIG. 2 is an embodiment of a geared motor provided with a multiplying gear train formed with a forced-cooling fan.

In FIG. 2, which shows another embodiment having a driven gear 4' mounted on a driven shaft 5' for rotation together therewith, the combined fan and gear 7' comprises a drive gear portion 9' of a large diameter formed integrally with fan portion 8' in openings 12 provided between the spokes of said gear portion. The area occupied by the spokes is made as small as possible while that occupied by the fan portion 8' is made large so as to effect a formed cooling of the motor. The drive or motor shaft 2 of the motor need not be specially long to carry the fan portion 8', so that undesirable vibration of the drive or motor shaft can be avoided and no increase in the manufacturing processes will result.

Although, in the above-mentioned embodiments, the object to be cooled has been a miniature motor, it is not limited thereto but may be an engine.

We claim:

1. A miniature motor comprising, in combination:
   a. a case having at least one inlet and at least one outlet slot for the passage of cooling air therethrough;
   b. a rotatable drive shaft extending through a portion of said case;
   c. a gear frame attached to said case;
   d. a driven shaft rotatably journalled in said gear frame;
   e. a driven gear secured to said driven shaft for rotation together therewith; and
   f. a drive gear secured to and rotatable with said drive shaft and a fan formed integrally with said drive gear, said drive gear including a plurality of spokes with said fan being formed in openings provided between said spokes of said drive gear, said drive shaft being only as long as is necessary to support said drive gear but not said fan which is positioned so as to direct a flow of air into said inlet slots when said drive gear and said driven gear are in meshing engagement with each other and said drive shaft is rotated.

2. A miniature motor as claimed in claim 1 in which said miniature motor is of the type that is driven from a nickel-cadmium battery.

3. A miniature motor as claimed in claim 1 in which said fan and said drive gear are formed integrally from synthetic resin.

4. A miniature motor comprising, in combination:
   a. a case having at least one inlet and at least one outlet slot for the passage of cooling air therethrough;
   b. a rotatable drive shaft extending through a portion of said case;
   c. a gear frame attached to said case;

d. a driven shaft rotatably journalled in said gear frame;

e. a driven gear secured to said driven shaft for rotation together therewith; and f. a drive gear secured to and rotatable with said drive shaft and a fan formed integrally with said drive gear, said drive shaft being only as long as is necessary to support said drive gear but not said fan which is positioned so as to direct a flow of air into said inlet slots when said drive gear and said driven gear are in meshing engagement with each other and said drive shaft is rotated.

5. A miniature motor as claimed in claim 4, in which said fan and said drive gear are formed integrally from synthetic resin.

6. A miniature motor as claimed in claim 4, in which said fan and said drive gear comprise a drive gear portion of a small diameter formed integrally with a fan of a larger diameter.

7. A miniature motor as claimed in claim 4, in which said miniature motor is of the type that is driven from a nickel-cadmium battery.

* * * * *